(12) United States Patent
Fagerlund et al.

(10) Patent No.: US 8,430,131 B2
(45) Date of Patent: Apr. 30, 2013

(54) NOISE CONTROL VIA OUTLET JET FREQUENCY DISPERSAL

(75) Inventors: Allen C. Fagerlund, Marshalltown, IA (US); Daniel Eilers, Marshalltown, IA (US); Michael W. McCarty, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 13/034,655

(22) Filed: Feb. 24, 2011

(65) Prior Publication Data

US 2012/0216887 A1 Aug. 30, 2012

(51) Int. Cl.
*F15D 1/00* (2006.01)
*F16K 3/24* (2006.01)

(52) U.S. Cl.
USPC .............. 138/42; 138/40; 138/37; 251/126; 251/127; 137/625.3; 137/625.33

(58) Field of Classification Search .............. 138/42, 138/43, 40; 251/126, 127; 137/625.3, 625.37, 137/625.33
See application file for complete search history.

(56) References Cited

U.S. PATENT DOCUMENTS

| | | | |
|---|---|---|---|
| 3,853,146 A | | 12/1974 | Blair |
| 3,971,411 A | * | 7/1976 | Baumann ................. 137/625.3 |
| 4,024,891 A | * | 5/1977 | Engel et al. ............... 137/625.3 |
| 4,047,540 A | | 9/1977 | Orme et al. |
| 4,105,048 A | * | 8/1978 | Self ............................. 138/42 |
| 4,127,146 A | * | 11/1978 | Self ........................... 137/625.3 |
| 4,148,340 A | | 4/1979 | Hutton |
| 4,384,592 A | * | 5/1983 | Ng ............................ 137/625.37 |
| 4,921,014 A | * | 5/1990 | Tartaglia et al. ........... 137/625.3 |
| 5,769,122 A | * | 6/1998 | Baumann et al. ......... 137/625.33 |
| 5,941,281 A | * | 8/1999 | Baumann et al. ......... 137/625.33 |

(Continued)

FOREIGN PATENT DOCUMENTS

| | | |
|---|---|---|
| DE | 30 45 057 A1 | 6/1982 |
| EP | 0 591 873 A1 | 4/1994 |

(Continued)

OTHER PUBLICATIONS

International Search Report for Application No. PCT/US2011/065141, dated Mar. 8, 2012.

(Continued)

*Primary Examiner* — Patrick F Brinson
(74) *Attorney, Agent, or Firm* — Marshall, Gerstein & Borun LLP

(57) ABSTRACT

A stackable noise attenuating disk includes an inner perimeter edge and an outer perimeter edge. A plurality of inlet passages is disposed along the inner perimeter edge and a plurality of outlet passages is disposed along the outer perimeter edge. The plurality of outlet passages includes a plurality of first outlet passages and a plurality of second outlet passages. Each of the plurality of first outlet passages have a first width and each of the plurality of second outlet passages have a second width that is greater than the first width. Fluid entering the inlet passages passes through a plenum section of adjacent disks to exit through the first and second outlet passages. The first outlet passages and second outlet passages cooperate to disperse the noise peak frequencies of fluid exiting the plurality of outlet passages, thereby reducing the overall noise level of fluid exiting the plurality of outlet passages.

17 Claims, 7 Drawing Sheets

U.S. PATENT DOCUMENTS

| | | | | |
|---|---|---|---|---|
| 6,026,859 | A * | 2/2000 | Wears et al. | 137/625.33 |
| 6,244,297 | B1 * | 6/2001 | Baumann | 137/625.3 |
| 6,615,874 | B2 * | 9/2003 | Thurston et al. | 138/42 |
| 6,718,633 | B1 * | 4/2004 | Glenn et al. | 29/890.124 |
| 7,195,034 | B2 * | 3/2007 | Shea | 137/625.37 |
| 7,320,340 | B2 * | 1/2008 | Bush et al. | 138/42 |
| 7,766,045 | B2 * | 8/2010 | Fagerlund et al. | 138/42 |
| 2003/0136454 | A1 * | 7/2003 | Thurston et al. | 138/42 |
| 2008/0023086 | A1 | 1/2008 | Fagerlund et al. | |
| 2010/0175768 | A1 * | 7/2010 | Haines | 138/42 |

FOREIGN PATENT DOCUMENTS

| | | |
|---|---|---|
| EP | 1 566 585 A1 | 8/2005 |
| EP | 1 750 045 A2 | 2/2007 |
| GB | 1 491 788 A | 11/1977 |
| GB | 2 443 418 A | 5/2008 |
| WO | WO-01/31242 A1 | 5/2001 |

OTHER PUBLICATIONS

Written Opinion for Application No. PCT/US2011/065141, dated Mar. 8, 2012.

International Search Report for PCT/US2011/025619 dated May 18, 2011.

Written Opinion of the International Searching Authority for PCT/US2011/025619 dated May 18, 2011.

* cited by examiner

NOISE CONTROL VIA OUTLET JET
FREQUENCY DISPERSAL

FIELD OF THE DISCLOSURE

This disclosure relates generally to pressure reduction devices such as stacked disk valve cages and vent diffusers having a plurality of outlet passages.

BACKGROUND

In typical control valves, a valve cage may provide guidance for a valve plug as the valve plug moves from a closed position in which the valve plug sealingly engages a valve seat to an open position in which the valve plug is disposed away from the valve seat. When the valve is in the open position, fluid flows from a valve inlet, passes through a passage between the valve seat and the valve plug, passes through the valve cage, and exits through a valve outlet. Typically, valve cages are comprised of a plurality of disks that are arranged in a vertical stack. The disks generally have a plurality of inlet passages, at least one plenum section, and a plurality of outlet passages. In such disks, fluid enters the inlet passages, passes through the plenum sections of adjacent disks, and exits through the outlet passages. In such stacked disk valve cages, fluid exiting the outlet passages can create high noise levels that can be capable of permanently damaging the hearing of persons working close to the control valve.

To reduce the overall noise level of the fluid exiting the valve cage, a common practice is to break up flow jets into the smallest possible independent jets. Breaking up the flow jets in this manner increases the frequency of the noise generated by fluid exiting the valve cage. Typically, the peak frequency can be increased to a level that is near to or above the range that can be sensed by the human ear. Breaking up the flow jets in this manner is typically accomplished using a plurality of uniformly-sized outlet passages disposed along the outer circumference of the disks. The smaller the size of the outlet passage, the greater the attenuation of the noise. However, the smaller the size of each outlet passage, the greater the number of outlet passages that are necessary to handle the fluid passing through the valve cage. Consequently, increasing the number of outlet passages increases manufacturing costs.

Stacked disks, such as those described above, may also be used in a vent diffuser to reduce the pressure of fluid, such as steam, exiting the diffuser to the atmosphere. As is the case in valve cages, noise reduction is typically accomplished by decreasing the size, and increasing the number, of uniformly-sized outlet passages. As explained above, this decrease in size and increase in number increases the manufacturing costs of the disks.

Other types of vent diffusers may comprise a cylindrical, hollow pipe having a plurality of uniformly-sized vent apertures disposed through the wall of the pipe diffuser. To reduce the overall noise level of the fluid exiting the pipe diffuser, the size of each vent aperture is minimized to break up flow jets into the smallest independent jets possible, thereby pushing the peak frequency of the generated noise out of the audible spectrum. However, as explained above, decreasing the size of the vent apertures increases the number of necessary vent apertures, thereby increasing manufacturing costs.

BRIEF SUMMARY OF THE DISCLOSURE

In accordance with one exemplary aspect of the present invention, a stackable noise attenuating disk includes an inner perimeter edge and an outer perimeter edge, and a plurality of inlet passages are disposed along the inner perimeter edge. The disk also includes a plurality of outlet passages disposed along the outer perimeter edge, and the plurality of outlet passages include a plurality of first outlet passages and a plurality of second outlet passages. Each of the plurality of first outlet passages has a first width and each of the plurality of second outlet passages has a second width that is greater than the first width. The plurality of inlet passages and the plurality of outlet passages are arranged such that fluid entering one of the plurality of inlet passages exits through one or both of the plurality of first outlet passages and the plurality of second outlet passages. Furthermore, each of the plurality of the first outlet passages and the plurality of the second outlet passages cooperate to disperse the noise peak frequencies of fluid exiting the plurality of outlet passages, thereby reducing the overall noise level of fluid exiting the plurality of outlet passages.

In accordance with another exemplary aspect of the present invention, a vent diffuser includes an elongated hollow pipe having a closed, impermeable bottom portion. A plurality of vent apertures extends though the pipe such that an interior of the pipe is in fluid communication with the atmosphere. The plurality of vent apertures includes a plurality of circular first vent apertures and a plurality of circular second vent apertures, and each of the plurality of second vent apertures has a diameter than is greater than the diameter of each of the plurality of first vent apertures. The plurality of first vent apertures and the plurality of second vent apertures cooperate to disperse the noise peak frequencies of fluid exiting the plurality of vent apertures, thereby reducing the overall noise level of fluid exiting the plurality of vent apertures.

DETAILED DESCRIPTION

Figure 1:
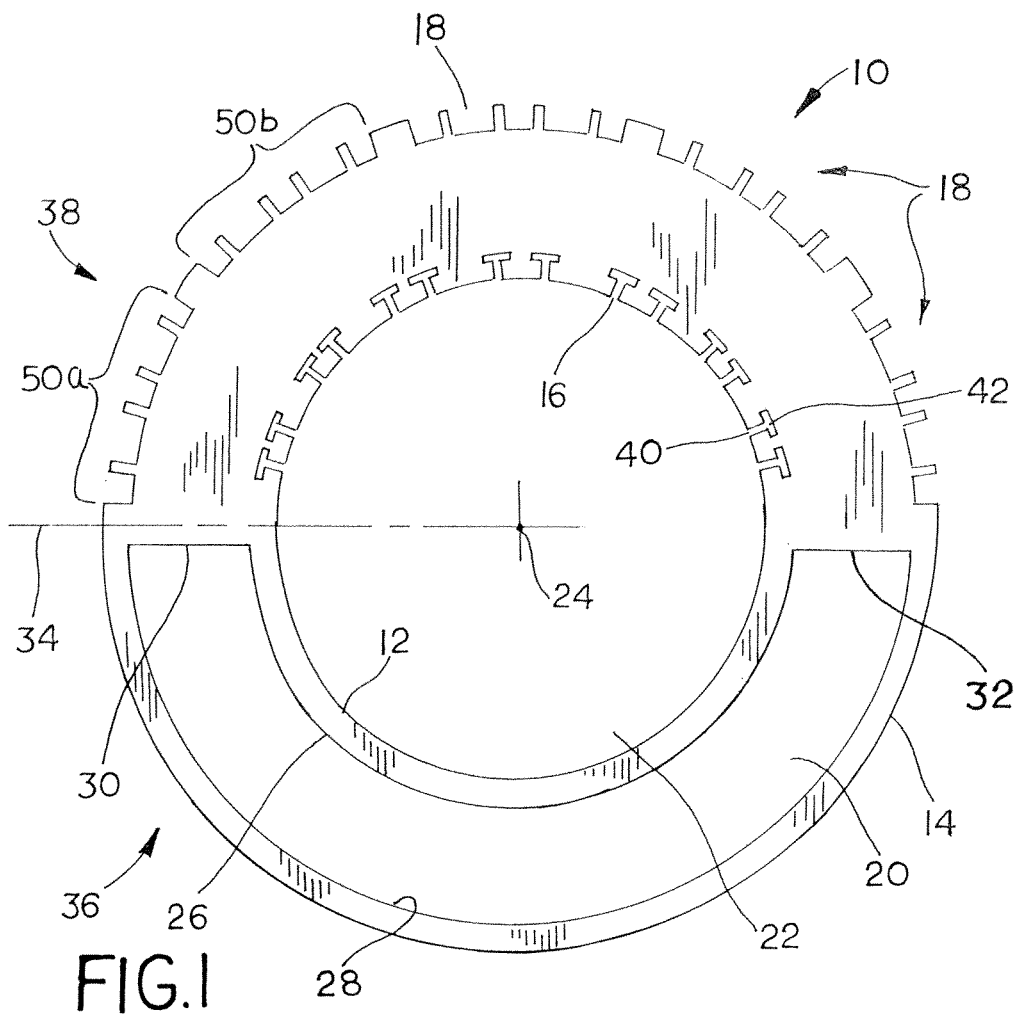
FIG. 1 is a top view of an embodiment of a stackable noise attenuating disk.

As illustrated in FIG. 1, a stackable noise attenuating disk 10 includes an inner perimeter edge 12 and an outer perimeter edge 14. A plurality of inlet passages 16 is disposed along the inner perimeter edge 12 and a plurality of outlet passages 18 is disposed along the outer perimeter edge 14. The plurality of outlet passages 18 includes a plurality of first outlet passages 18a and a plurality of second outlet passages 18b. Each of the plurality of first outlet passages 18a have a first width $W_1$ and each of the plurality of second outlet passages 18b have a second width $W_2$ that is greater than the first width $W_1$. Fluid entering at least one of the inlet passages 16 passes through a plenum section 20 of one or more adjacent disks to exit through one or both of the first outlet passage 18a and the second outlet passage 18b. The first outlet passages 18a and second outlet passages 18b cooperate to disperse the noise peak frequencies of fluid exiting the plurality of outlet passages 18, thereby reducing the overall noise level of fluid exiting the plurality of outlet passages 18.

As illustrated in FIG. 1, the disk 10 may be substantially planar and may have a substantially annular shape. The disk 10 may be made from a metal, a metal alloy, or any suitable material. More specifically, the disk 10 may be defined by an inner perimeter edge 12 that defines a central aperture 22. The inner perimeter edge 12 may be circular or substantially circular in shape, thereby defining a circular central aperture 22. The disk 10 may be further defined by an outer perimeter edge 14 that may be circular in shape, and the circular outer perimeter edge 14 and circular inner perimeter edge 12 may be concentric about a shared center point 24.

Still referring to FIG. 1, the disk 10 may also include a plenum section 20 that is disposed between the outer perimeter edge 14 and the inner perimeter edge 12. The plenum section 20 may be defined by an inner edge 26 that is outwardly offset in the radial direction from the inner perimeter edge 12 of the disk 10. In addition, the plenum section 20 may be defined by an outer edge 28 that is inwardly offset in the radial direction from the outer perimeter edge 14 of the disk 10. The radial distance in which the inner edge 26 of the plenum 20 is outwardly offset from the inner perimeter edge 12 of the disk 10 and in which the outer edge 28 is inwardly offset from the outer perimeter edge 14 of the disk 10 is related to the radial distance that the inlet passages 16 outwardly extend from the inner perimeter edge 12 of the disk 10 and the radial distance that the outlet passages 18 inwardly extend from the outer perimeter edge 14 of the disk 10, and this relationship will be described in more detail below. The plenum section 20 may be laterally defined by a first end wall 32 and a second end wall 34 that each extends in a radial direction between the inner edge 26 and the outer edge 28 of the plenum 20. The first end wall 32 and the second end walls 34 may each be slightly offset from a centerline 34 that passes through the center point 24, and the centerline 34 may divide the disk into a first disk portion 36 and a second disk portion 38.

Instead of a single plenum section 20 described above, the disk may have two or more plenum sections 20. For example, a plurality of plenum sections 20 may be disposed between the outer perimeter edge 14 and the inner perimeter edge 12. In disks 10 having multiple plenum sections 20, the disks 10 may also include a plurality of additional inlet passages (not shown) that are outwardly disposed relative to the inlet passages 16 disposed around the inner perimeter edge 12, and the disks may also include a plurality of additional outlet passages (not shown) that are inwardly disposed relative to the outlet passages 18 disposed around the outer perimeter edge 14. In such disks 10, the additional inlet passages and outlet passages cooperate to allow fluid to flow into the multiple plenum sections 20 as fluid flows from the inlet passages 16 to the outlet passages 18. In a further embodiment, the disk may not have a plenum section 20 at all, but may instead have one or more channels that extend between an inlet passage 16 disposed around the inner perimeter edge 12 of the disk 10 and one or more outlet passages 18 disposed around the outer perimeter edge 14 of the disk 10. The channel (or each of the channels) may be a narrow passage having one or more restrictions, such as a change in the direction of the narrow passage (i.e., a tortuous path).

Referring again to FIG. 1, the disk 10 may also include a plurality of inlet passages 16 disposed along the inner perimeter edge 12 of the disk 10. Each of the inlet passages 16 may include a channel portion 40 that is disposed in a radial direction, and the channel portion 16 intersects a slot portion 42 that is perpendicular to the channel portion such that the inlet passage 16 has a "T" shape. The plurality of inlet passages 16 may be disposed at any suitable location along the circumference of the inner perimeter edge 12. For example, as illustrated in FIG. 1, the plurality of inlet passages 16 may be disposed only along the portion of the inner perimeter edge 12 included in the second disk portion 38. Adjacent inlet passages 16 may have any suitable spacing. For example, adjacent inlet passages 16 may be uniformly spaced as illustrated in FIG. 1. The slot portion 42 may be inwardly spaced from the inner perimeter edge 12 of the disk 10 such that the slot portion 42 is in fluid communication with a plenum 20 portion of at least one adjacent disks 10 when a plurality of disks 10 are vertically stacked in the manner discussed in detail below.

Figure 2:
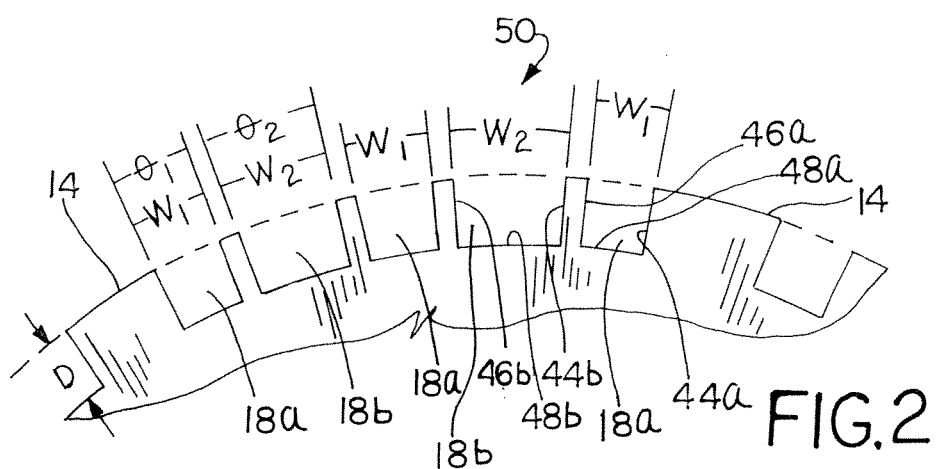
FIG. 2 is a partial top view of the embodiment of the stackable noise attenuating disk of FIG. 1.

As illustrated in FIGS. 1 and 2, a plurality of outlet passages 18 is disposed along the outer perimeter edge 14 of the disk 10. The plurality of outlet passages 18 may be disposed at any suitable location along the circumference of the outer perimeter edge 14. For example, as illustrated in FIG. 1, the plurality of outlet passages 18 may be disposed only along the portion of the outer perimeter edge 14 included in the second disk portion 38. The plurality of outlet passages 18 includes a plurality of first outlet passages 18a and a plurality of second outlet passages 18b. Each of the plurality of first outlet passages 18a may include a first lateral edge 44a and a second lateral edge 46a, and each of the first lateral edge 44a and the second lateral edge 46a may inwardly extend from the outer perimeter edge 14 in a radial direction towards the center point 24 of the disk 10. A circumferential inner edge 48a may extend between the first lateral edge 44a and second lateral edge 46a, and the inner edge 48a may have the shape of a circular arc that is radially offset by a distance D from the outer perimeter edge 14 of the disk 10. The slot portion 42 may be inwardly spaced from the inner perimeter edge 12 of the disk 10 such that the slot portion 42 is in fluid communication with a plenum 20 portion of at least one adjacent disks 10 when a plurality of disks 10 are vertically stacked in the manner discussed in detail below.

The first lateral edge 44a and second lateral edge 46a of the first outlet passage 18a may be separated by a first width $W_1$, and this first width $W_1$ may be a first angular distance $\theta_1$. In an alternative embodiment, the first lateral edge 44a and second lateral edge 46a may be parallel instead of radially disposed, and in this embodiment, the first width $W_1$ is the linear distance between the first lateral edge 44a and second lateral edge 46a.

Referring again to FIGS. 1 and 2, each of the plurality of second outlet passages 18b may include a first lateral edge 44b and a second lateral edge 46b, and each of the first lateral edge 44b and second lateral edge 46b may inwardly extend from the outer perimeter edge 14 in a radial direction towards the center point 24 of the disk 10. A circumferential inner edge 48b may extend between the first lateral edge 44b and second lateral edge 46b, and the inner edge 48b may have the shape of a circular arc that is radially offset by a distance D from the outer perimeter edge 14 of the disk 10. The distance D of the second outlet passages 18b may be the same value as the distance D of the first outlet passages 18a, as illustrated in FIGS. 1 and 2, or the distance D may be different. The first lateral edge 44b and second lateral edge 46b of the second outlet passage 18b may be separated by a second width $W_2$, and this second width $W_2$ may be a second angular distance $\theta_2$ that is greater than the first angular distance $\theta_1$. In an alternative embodiment, the first lateral edge 44b and second lateral edge 46b may be parallel instead of radially disposed. In this embodiment, the second width $W_2$ is the linear distance between the first lateral edge 44b and second lateral edge 46b, and the second width $W_2$ is greater than the first width $W_1$.

Referring once more to the embodiment of FIGS. 1 and 2, each of the plurality of outlet passages 18 may be either a first outlet passage 18a or a second outlet passage 18b. In one configuration of the disk 10, the first outlet passages 18a and second outlet passages 18b may alternate in position such that each first outlet passage 18a is adjacent to at least one second outlet passage 18b and each second outlet passage 18b is adjacent to at least one first outlet passage 18a. However, any suitable configuration of first outlet passages 18a and second outlet passages 18b is contemplated.

The first outlet passages 18a and second outlet passages 18b may be disposed along the outer perimeter edge 14 of the disk 10 is discrete outlet groups 50, and the outlet groups 50 may include any suitable number of first outlet passages 18a and second outlet passages 18b. For example, each of the outlet groups 50 may include five individual outlet passages 18, and the five outlet passages 18 may include one to four first outlet passages 18a, with the remainder of the five outlet passages being second outlet passages 18b. By way of example, an outlet group 50 may include two second outlet passages 18b and three first outlet passages 18a, with each second outlet passage 18b being disposed between a pair of first outlet passages 18a. As another example, an outlet group 50 may include two first outlet passages 18a and three second outlet passages 18b, with each first outlet passage 18a being disposed between a pair of second outlet passages 18b. The relative order of first outlet passages 18a and second outlet passages 18b within a first outlet group 50a may be the same as the relative order of first outlet passages 18a and second outlet passages 18b within a second outlet group 50b. Indeed, each of a plurality of outlet groups 50 may have the same relative order of first outlet passages 18a and second outlet passages 18b. However, the relative order of first outlet passages 18a and second outlet passages 18b in a particular outlet group 50 may vary among the plurality of outlet groups 50.

Figure 3:
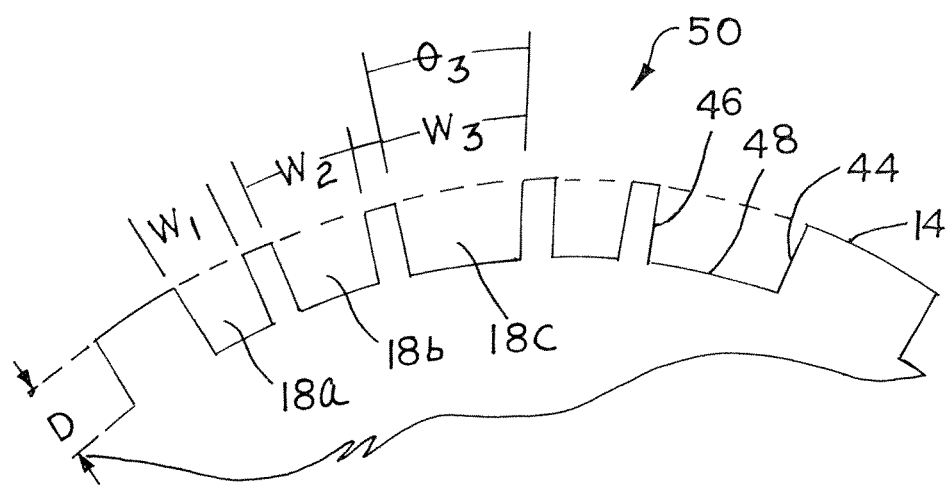
FIG. 3 is a partial top view of an alternate embodiment of the stackable noise attenuating disk.

Instead of having only a plurality of first outlet passages 18a and a plurality of second outlet passages 18b, the plurality of outlet passages 18 may include any number of differently sized outlet passages 18. For example, as illustrated in FIG. 3, the plurality of outlet passages 18 may include one or more third outlet passages 18c that may each include a first lateral edge 44c and a second lateral edge 46c, and each of the first lateral edge 44c and second lateral edge 46c may inwardly extend from the outer perimeter edge 14 in a radial direction towards the center point 24 of the disk 10. A circumferential inner edge 48c may extend between the first lateral edge 44c and second lateral edge 46c, and the inner edge 48c may have the shape of a circular arc that is radially offset by a distance D from the outer perimeter edge 14 of the disk 10. The first lateral edge 44c and second lateral edge 46d of the third outlet passage 18b may be separated by a third width $W_3$, and this third width $W_3$ may be a third angular distance $\theta_3$ that is greater than the second angular distance $\theta_2$. In an alternative embodiment, the first lateral edge 44c and second lateral edge 46c may be parallel instead of radially disposed. In this embodiment, the third width $W_3$ is the linear distance between the first lateral edge 44c and second lateral edge 46c, and the third width $W_3$ is greater than the second width $W_2$. The third width $W_3$ may also be any linear width or angular distance that is different than that of the first and second widths $W_1$, $W_2$.

The one or more third outlet passages 18c may be disposed at any position relative to the first and second outlet passages 18a, 18b. For example, a third outlet passage 18c may be disposed between one first outlet passage 18a and one second outlet passage 18b. In addition, if the plurality of outlet passages 18 is arranged in a plurality of outlet groups 50, one or more third outlet passages 18c may be included in any or all of plurality of outlet groups 50.

In addition to the third outlet passages 18c, the plurality of outlet passages 18 may include one or more fourth outlet passages 18d, fifth outlet passages 18e, or any further number of outlet passages. The one or more fourth outlet passages 18d may be identical to the third outlet passages 18c described above, with the exception that the first lateral edge 44d and second lateral edge 46d of the fourth outlet passage 18d may be separated by a fourth width $W_4$, and this fourth width $W_4$ may be a fourth angular distance $\theta_4$ that is greater than third angular distance $\theta_3$. Alternatively, the fourth width $W_4$ may be the linear distance between the first lateral edge 44d and second lateral edge 46d, and the fourth width $W_4$ is greater than the third width $W_3$. One or more fifth outlet passages 18e may also be identical to the third outlet passages 18c described above, with the exception that the first lateral edge 44e and second lateral edge 46e of the fifth outlet passage 18e may be separated by a fifth width $W_5$, and this fifth width $W_5$ may be a fifth angular distance $\theta_5$ that is greater than the fourth angular distance $\theta_4$. Alternatively, the fifth width $W_5$ may be the linear distance between the first lateral edge 44e and the second lateral edge 46e, and the fifth width $W_5$ is greater than the fourth width $W_4$. One having ordinary skill in the art would recognize that a sixth outlet passage 18f having a sixth width $W_6$, a seventh outlet passage 18g having a seventh width $W_7$, and an eighth outlet passage 18h having an eighth width $W_8$, etc., are contemplated. The sixth width $W_6$ is greater than the fifth width $W_5$, the seventh width $W_7$ is greater than the sixth width $W_6$, the eighth width $W_8$ is greater than the seventh width $W_7$, and so on.

The one or more fourth outlet passages 18d, fifth outlet passages 18e, and so on, may be disposed at any position relative to the first, second, and third outlet passages 18a, 18b, 18c. In addition, if the plurality of outlet passages 18 is arranged in a plurality of outlet groups 50, one or more of the fourth outlet passages 18d, fifth outlet passages 18e, and so on may be included in any or all of plurality of outlet groups 50.

Figure 4:
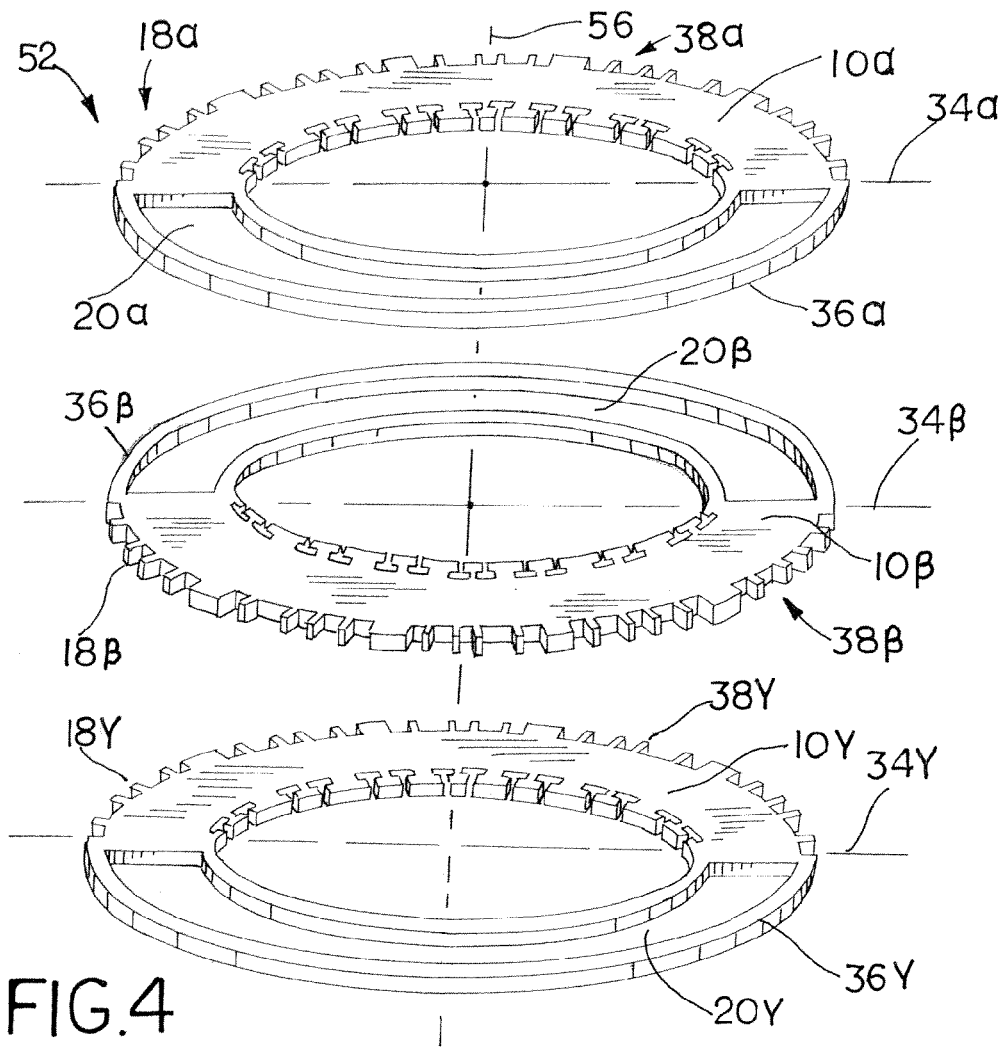
FIG. 4 is an exploded perspective view of a stack of disks, with each disk being the embodiment of the disk illustrated in FIG. 1.
Figure 6:
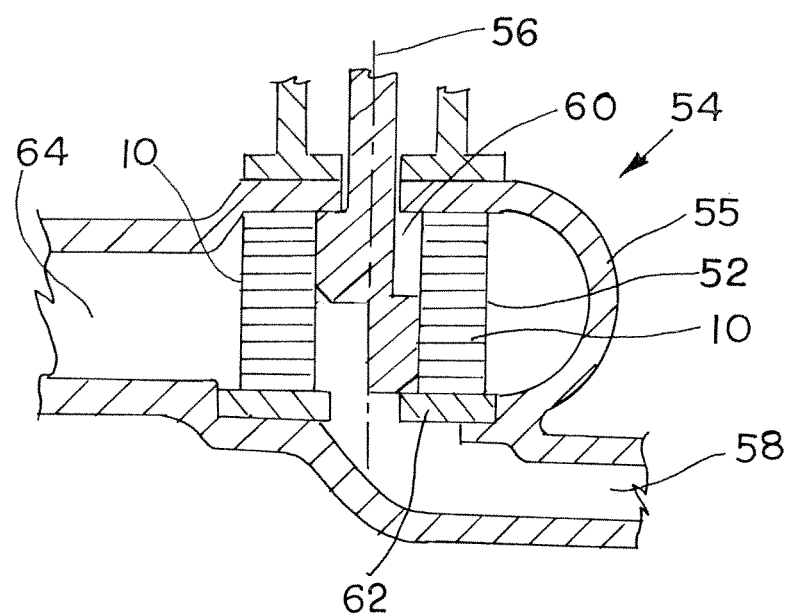
FIG. 6 is an partial sectional side view of a control valve that includes a stack of disks, with each disk being the embodiment of the disk illustrated in FIG. 1.

In use, a plurality of disks 10 may be stacked to form a valve cage 52 for use in a control valve 54, as illustrated in FIG. 6. A plurality of apertures (not shown) may be formed in each of the plurality of disks 10 comprising the valve cage 52 such that a vertical rod or through bolt (not shown) may be disposed in each of the apertures, thereby maintaining the stack of disks 10 in vertical and horizontal alignment. The valve cage 52 may be comprised of a stack of identical disks 10, and the disks 10 may alternate in orientation along the vertical axis 56 of the valve cage 52. Specifically, as illustrated in the partial exploded view of a valve cage 52 in FIG. 4, a center line 34β of a second disk 10β may be vertically aligned with a center line 34α of a first disk 10α, but the first disk portion 36α of the first disk 10α may be disposed above a second disk portion 38β of the second disk 10β. A center line 34c of a third disk 10c may be vertically aligned with the center line 34α of a first disk 10α and the center line of the second disk 10β, and the second disk portion 38β of the second disk 10β may be disposed above the first disk portion 36γ of the third disk 10γ. This alternating pattern may repeat for each of the plurality of disks 10 comprising the valve cage 52. However, any suitable configuration or orientation of disks 10 is contemplated. In addition, instead of a repeating stack of identical disks, the valve cage 52 may include two or more different disks.

As illustrated in FIG. 6, the control valve 54 includes a housing 55, an inlet 58 and an outlet 64 formed in the housing 55, a valve seat 62 disposed within the housing 55 between the inlet 58 and the outlet 64, and a valve plug 60 that vertically displaces from a first position in which the valve plug 60 sealingly engages the valve seat 62 to a second position in which the valve plug 60 is remotely disposed from the valve seat 60. When fluid enters the inlet 58 of a control valve 54 and a valve plug 60 is disposed away from a valve seat 62, fluid flows through the valve cage 52 towards an outlet 64. Specifically, fluid enters at least one of the inlet passages 16, the fluid flows through a plenum section 20 of one or more adjacent disks to exit through one or both of the first outlet passage 18a and the second outlet passage 18b, for example. If other outlet passages 18, such as a third outlet passage 18c, for example, are included in the disk 10, then fluid may exit through any or all of the first outlet passage 18a, the second outlet passage 18b, and the third outlet passage 18c.

Figure 5:
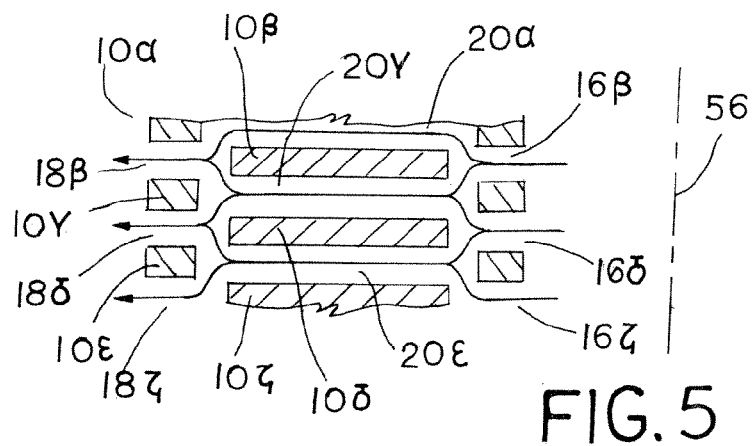
FIG. 5 is an partial side sectional view of a stack of disks, with each disk being the embodiment of the disk illustrated in FIG. 1.

An example of the flow of fluid through the valve cage 10 is shown in more detail in FIG. 5, which is a partial cross-sectional view of a valve cage 52. Fluid entering the valve cage 52 flows in a radial direction into the channel portions 40 of the inlet passages 16β, 16δ, 16ζ of disks 10β, 10δ, 10ζ, respectively. The fluid then enters the slot portions 42 of the inlet passages 16β, 16δ, 16ζ, and the fluid flows axially to enter the plenum sections 20α, 20γ, 20ε of adjacent disks 10α, 10γ, 10ε, respectively. The fluid flow then continues radially through the plenum sections 20α, 20γ, 20ε of the adjacent disks, then the fluid flows axially into the outlet slots 18β, 18δ, 18ζ of disks 10β, 10δ, 10ζ, respectively. The fluid flows radially through the outlet slots 18β, 18δ, 18ζ of disks 10β, 10δ, 10ζ, and the fluid then exits the valve cage 52. As explained above, fluid may exit through any or all of the first outlet passages 18a and the second outlet passages 18b of each of the disks 10β, 10δ, 10ζ, when only two sizes of outlets passages are included in each of the disks 10β, 10δ, 10ζ. If three or more sizes of outlet passages are included in the disk, fluid may exit through any or all of the first outlet passages 18a, the second outlet passages 18b, the third outlet passages 18c, and so on, of each of the disks 10β, 10δ, 10ζ.

The disks 10 of the disclosed valve cage 52 having a plurality of outlet passages 18 possessing non-uniform widths provide a greater level of noise reduction than disks having uniform widths. Specifically, the plurality of outlet passages 18 having non-uniform widths (such as first outlet passage 18a and second outlet passage 18b) cooperate to develop substantially non-uniform outlet jet lengths. The outlet jet length can be defined as the length of the plume of the fluid exiting the outlet passage. Because the outlet jet lengths are non-uniform, the sound energy at the outlet passages is not released at the same peak frequency, and the resulting dispersal of outlet peak frequencies lowers the overall trim noise level.

In order to adequately disperse the peak frequencies of fluid exiting the outlet passages, the difference in the flow areas of non-uniform outlet passages 18 (such as the first outlet passage 18a and second outlet passage 18b) must be sufficiently large. As one having ordinary skill in the art would understand, the difference in outlet flow area of outlet passages having a uniform depth is proportional to the angular or linear width. Accordingly, the difference in the width $W_1$ of the first outlet passage 18a and the width $W_2$ of the second outlet passage 18b should result in, at a recommended minimum, a nineteen percent difference in outlet flow area. It is also important that the difference in the flow areas of the outlet passages (such as difference in the flow areas of the first outlet passage 18a and the second outlet passage 18b) is not a direct multiple of the flow areas. Multiples of prime number percentages are recommended. However, consideration must be given such that the largest outlet passage is not too large to effectively attenuate the noise of the fluid exiting the outlet passage. One having ordinary skill in the art would recognize that the only cost increase associated with the disk 10 is the cost of implementing a new cutting pattern in production, and this cost increase is partially offset with reduced cutting time.

Figure 7:
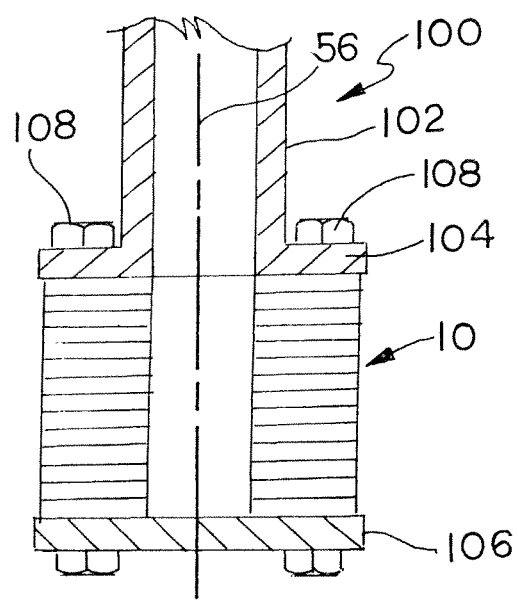
FIG. 7 is an partial sectional side view of a vent diffuser that includes a stack of disks, with each disk being the embodiment of the disk illustrated in FIG. 1.

While the embodiments of the plurality of disks 10 have thus far been disclosed as comprising a valve cage 52, the plurality of disks 10 can also be included in a vent diffuser to reduce the pressure of fluid exiting the vent diffuser, while attenuating the noise levels caused by the exiting fluids. As illustrated in FIG. 7, the vent diffuser 100 may include a hollow, cylindrical pipe 102 having a neck flange 104 at a terminal end of the cylindrical pipe 102. The plurality of disks 10, which may be structurally and functionally identical to the plurality of disks 10 discussed in connection with the valve cage 52, may be disposed between a bottom surface of the neck flange 104 and atop surface of an impermeable, planar end plate 106. The cylindrical pipe 102, the plurality of disks 10, and the end plate 106 may be coupled by a plurality of through bolts 108 that extend through each of a plurality of axially-aligned apertures that extend through the neck flange 104, each of the plurality of disks 10, and the end plate 106. In an embodiment of the vent diffuser 100, high pressure fluid passes from the interior of the cylindrical pipe 102 into at least one of the inlet passages 16. Fluid then flows through a plenum section 20 of one or more adjacent disks to exit through one or both of the first outlet passage 18a and the second outlet passage 18b, for example. If other outlet passages, such as a third outlet passage 18c, for example, are included in the disk 10, then fluid may exit through any or all of the first outlet passage 18a, the second outlet passage 18b, and the third outlet passage 18c. In the manner described above, the peak frequencies of the fluid exiting the outlet passages 18 are dispersed, thereby attenuating the noise of fluid exiting the vent diffuser.

Figure 8:
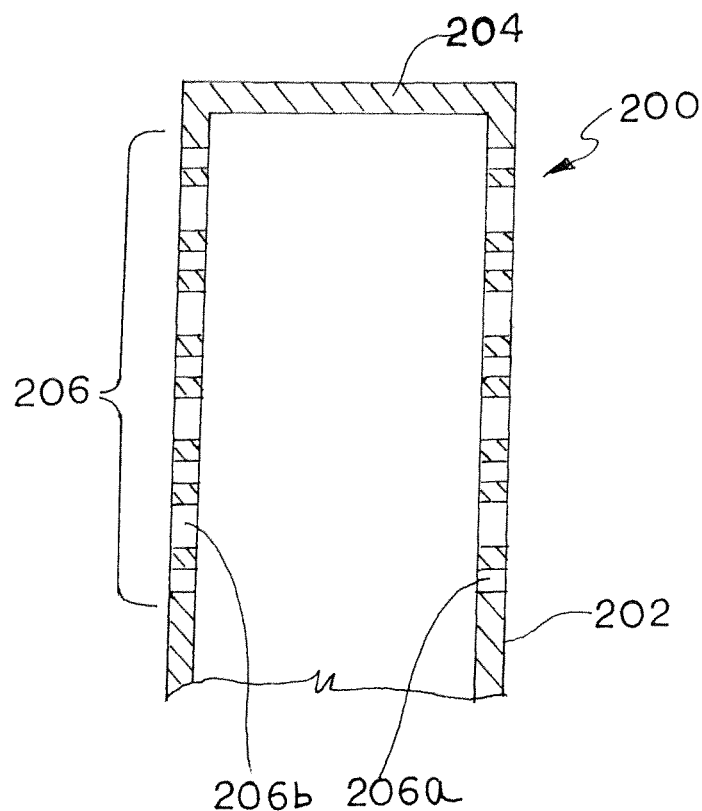
FIG. 8 is an partial sectional side view of an embodiment of a vent diffuser that includes a plurality of vent apertures.
Figure 9:
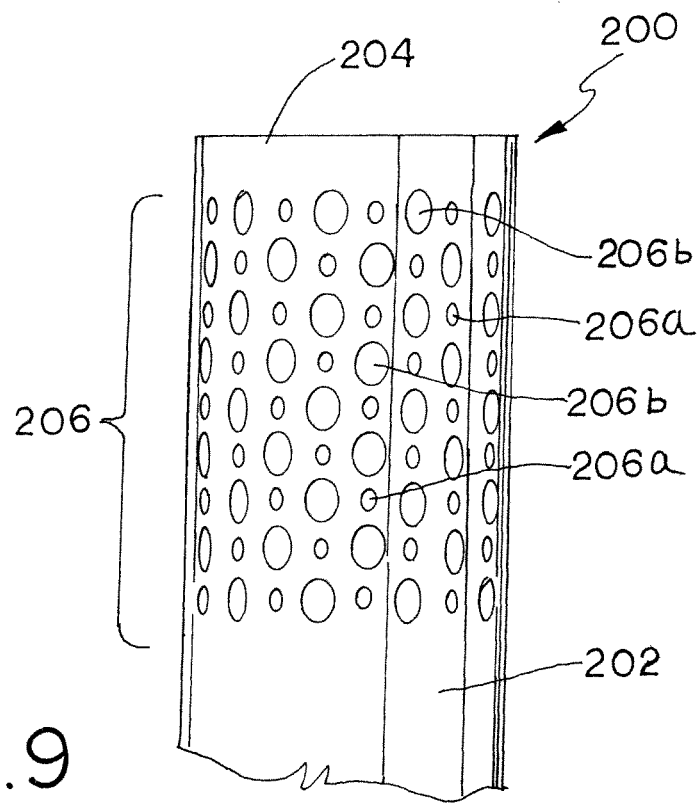
FIG. 9 is a partial side view of the embodiment of the vent diffuser of FIG. 8.

Referring to FIGS. 8 and 9, an alternative embodiment of a vent diffuser 200 is provided. As illustrated in FIG. 9, the vent diffuser 200 may include an elongated hollow, cylindrical pipe 202 having a closed, impermeable top portion 204. The hollow interior of the cylindrical pipe 202 may be in fluid communication with a source of high-pressure fluid, such as steam. The top portion 204 may be integrally formed with the cylindrical pipe 202, or may be coupled to the cylindrical pipe 202. The top portion 204 may be planar, as provided in FIGS. 8 and 9, or may have any shape suitable for a particular application. A plurality of vent apertures 206 may extend though the cylindrical pipe 202 such that the interior of the cylindrical pipe 202 is in fluid communication with the atmosphere. Each of the plurality of vent apertures 206 may extend through the cylindrical pipe 202 in a substantially radial direction. Each of the plurality of vent apertures 206 may have any suitable shape, such as that of a circle, and oval, or a polygon, for example. The plurality of vent apertures 206 may include a plurality of first vent apertures 206a and a plurality of second vent apertures 206b, and each of the plurality of second vent apertures 206b may be larger than each of the plurality of first vent apertures 206a. For example, each of the plurality of first vent apertures 206a and the plurality of second vent apertures 206b may have a circular shape, and the diameter of the second vent apertures 206 may be larger than the diameter of the first vent apertures 206a.

As illustrated in FIG. 9, the plurality of first vent apertures 206a and the plurality of second vent apertures 206b may be axially and circumferentially aligned. Moreover, each first vent aperture 206a may be adjacent to at least one second vent aperture 206b. For example, a first vent aperture 206a may be disposed between a first pair of second vent apertures 206b, and the first vent aperture 206a and the first pair of second vent apertures 206b may be circumferentially aligned (i.e., horizontally aligned in the embodiment illustrated in FIGS. 8 and 9). In addition, the first vent aperture 206a may be disposed between a second pair of second vent apertures 206b such that the first vent aperture 206a and the pair of second vent apertures 206b may be axially aligned (i.e., aligned in a direction parallel to the longitudinal axis of the cylindrical pipe 202 in the embodiment illustrated in FIGS. 8 and 9). Instead of the configuration illustrated in FIGS. 8 and 9, the plurality of first vent apertures 206a and second vent apertures 206b may be configured in any orientation suitable for a particular application. Moreover, the plurality of vent apertures 206 may include a plurality of third vent apertures 206c, and the third vent apertures 206c may be circular in shape, and may have a diameter that is larger than the diameter of the second vent apertures 206b. Each of the plurality of third vent apertures 206c may be disposed adjacent to at least one first vent aperture 206a and/or at least one second vent apertures 206b. The plurality of vent apertures 206 may extend around the entire circumference of the cylindrical pipe 202, or the plurality of vent apertures 206 may extend around a portion of the circumference of the cylindrical pipe 202. In addition, the plurality of vent apertures 206 may axially extend from a from a portion of the cylindrical pipe 202 that is adjacent to the top portion 204 to a portion of the cylindrical pipe 202 that is axially offset from the top portion 204 of the cylindrical pipe 202.

The vent diffuser 200 having a plurality of vent apertures 206 possessing non-uniform diameters provides a greater level of noise reduction than vent diffuser having uniform diameters. Specifically, the plurality of vent apertures 206 having non-uniform diameters (such as the first vent apertures 206a and the second vent apertures 206b) cooperate to develop substantially non-uniform outlet jet sizes. Because the outlet jet lengths are non-uniform, the sound energy at the vent apertures is not released at the same peak frequency, and the resulting dispersal of outlet peak frequencies lowers the overall noise level.

In order to adequately disperse the peak frequencies of fluid exiting the vent apertures 206, the difference in the flow areas of non-uniform vent apertures 206 (such as the first vent apertures 206a and the second vent apertures 206b) must be sufficiently large. Specifically, the flow area of the first vent apertures 206a and the flow area of the second vent apertures 206b should have, at a recommended minimum, a nineteen percent difference in flow area. It is also important that the difference in the flow areas of the vent apertures (such as difference in the flow areas of the first vent apertures 206a and the second vent apertures 206b) is not a direct multiple of the flow areas. Multiples of prime number percentages are recommended. However, consideration must be given such that the largest vent aperture is not too large to effectively attenuate the noise of the fluid exiting the outlet passage. One having ordinary skill in the art would recognize that the only cost increase associated with the vent diffuser 200 is the incremental cost of an additional setup in manufacturing.

Figure 10:
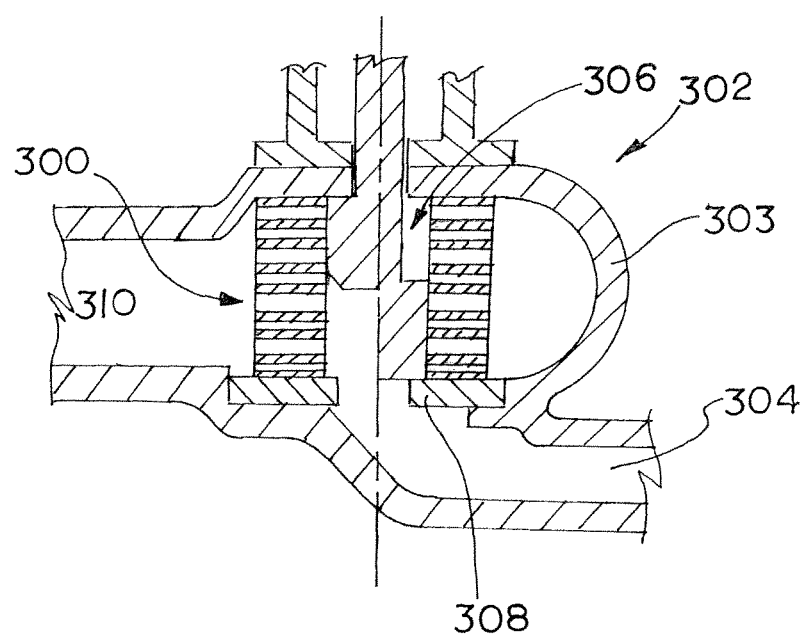
FIG. 10 is an partial sectional side view of a control valve that includes a valve cage comprising a cylindrical pipe having a plurality of vent apertures.

Instead of a vent diffuser, the cylindrical pipe 202 having a plurality of vent apertures 206 may form a valve cage 300 for use in a control valve 302, as illustrated in FIG. 10. The control valve 302 comprises a housing 303, an inlet 304 and an outlet 310 formed in the housing 303, a valve seat 308 disposed within the housing 303 between the inlet 304 and the outlet 310, and a valve plug 306 that vertically displaces from a first position in which the valve plug 306 sealingly engages the valve seat 308 to a second position in which the valve plug 306 is remotely disposed from the valve seat 308. When fluid enters the inlet 304 of the control valve 302 and the valve plug 306 is disposed away from the valve seat 308 (i.e., an open position), fluid flows through the plurality of vent apertures 206 of the valve cage 300 towards the outlet 310. More specifically, when the control valve 302 is in the open position, fluid from the inlet 304 may enter each of the plurality of first vent apertures 206a and second vent apertures 206b from the hollow interior of the cylindrical pipe 202 and the fluid may flow through the apertures and exit each of the plurality of first vent apertures 206a and second vent apertures 206b. The plurality of vent apertures 206 of the valve cage 300 may be identical in form and function to the plurality of vent apertures 206 of the vent diffuser 200 described above. For example, each of the plurality of first vent apertures 206a and the plurality of second vent apertures 206b may have a circular shape, and the diameter of the second vent apertures 206 may be larger than the diameter of the first vent apertures 206a. The plurality of first vent apertures 206a and second vent apertures 206b may be configured in any orientation suitable for a particular application, such as the configurations described in the discussion of the vent diffuser 200. For example, the plurality of first vent apertures 206a and the plurality of second vent apertures 206b may be axially aligned, but not circumferentially aligned. Moreover, any number of differently-sized vent apertures 206 are contemplated. For example, the plurality of vent apertures 206 may include a plurality of third vent apertures 206c, and the third vent apertures 206c may be circular in shape, and may have a diameter that is larger than the diameter of the second vent apertures 206b. The plurality of vent apertures 206 may extend around the entire circumference of the cylindrical pipe 202, or the plurality of vent apertures 206 may extend around a portion of the circumference of the cylindrical pipe 202. In addition, the plurality of vent apertures 206 may axially extend from a from a portion of the cylindrical pipe 202 that is adjacent to a top portion to a portion of the cylindrical pipe 202 that is adjacent to a bottom portion of the cylindrical pipe 202.

In a manner identical to the vent diffuser 200 described above, the valve cage 300 having a plurality of vent apertures 206 possessing non-uniform diameters provides a greater level of noise reduction than valve cages having uniform diameters. Specifically, the plurality of vent apertures 206 having non-uniform diameters (such as the first vent apertures 206a and the second vent apertures 206b) cooperate to develop substantially non-uniform outlet jet sizes. Because the outlet jet sizes are non-uniform, the sound energy at the vent apertures is not released at the same peak frequency, and the resulting dispersal of outlet peak frequencies lowers the overall noise level.

While various embodiments have been described above, this disclosure is not intended to be limited thereto. Variations can be made to the disclosed embodiments that are still within the scope of the appended claims.

What is claimed is:

1. A stackable noise attenuating disk comprising:
an inner perimeter edge;

an outer perimeter edge;
a plurality of inlet passages disposed along the inner perimeter edge;
a plurality of outlet passages disposed along the outer perimeter edge, the plurality of outlet passages including a plurality of first outlet passages and a plurality of second outlet passages, each of the plurality of first outlet passages having a first width and each of the plurality of second outlet passages having a second width that is greater than the first width,
wherein the plurality of inlet passages and the plurality of outlet passages are arranged such that fluid entering one of the plurality of inlet passages exits through one or both of the plurality of first outlet passages and the plurality of second outlet passages, and wherein the first outlet passages and second outlet passages cooperate to disperse the noise peak frequencies of fluid exiting the plurality of outlet passages, thereby reducing the overall noise level of fluid exiting the plurality of outlet passages,
wherein each of the plurality of first outlet passages and the plurality of second outlet passages are defined by a first lateral edge, a second lateral edge, and a circumferential inner edge, and wherein the first lateral edge and the second lateral edge of each of the plurality of first outlet passages and the plurality of second outlet passages have the same length.

2. The stackable noise attenuating disk of claim 1, wherein the first lateral edge and the second lateral edge of each of the plurality of first outlet passages is separated by a first angular distance, and the first angular distance is the first width, and wherein the first lateral edge and the second lateral edge of each of the plurality of second outlet passages is separated by a second angular distance, and the second angular distance is the second width.

3. The stackable noise attenuating disk of claim 1, wherein one of the plurality of first outlet passages is adjacent to one of the plurality of second outlet passages.

4. The stackable noise attenuating disk of claim 1, wherein the disk includes one or more outlet groups, wherein each of the one or more outlet groups includes at least one first outlet passage and at least one second outlet passage.

5. The stackable noise attenuating disk of claim 4, wherein the one or more outlet groups includes a first outlet group and a second outlet group, wherein each outlet group includes at least two first outlet passages and at least two second outlet passages.

6. The stackable noise attenuating disk of claim 5, wherein each of the at least two first outlet passages is adjacent to at least one second outlet passage.

7. The stackable noise attenuating disk of claim 1, wherein the plurality of outlet passages includes a plurality of third outlet passages, each of the plurality of third outlet passages having a third width that is greater than the second width, and wherein the plurality of third outlet passages are defined by a first lateral edge, a second lateral edge, and a circumferential inner edge.

8. The stackable noise attenuating disk of claim 7, wherein the first lateral edge and the second lateral edge of each of the plurality of third outlet passages is separated by a third angular distance, and the third angular distance is the third width.

9. The stackable noise attenuating disk of claim 8, wherein one of the plurality of third outlet passages is adjacent to one of the plurality of first outlet passages and second outlet passages.

10. The stackable noise attenuating disk of claim 8, wherein the disk includes one or more outlet groups, wherein each of the one or more outlet groups includes at least one first outlet passage, at least one second outlet passage, and at least one third outlet passage.

11. The stackable noise attenuating disk of claim 1, wherein fluid entering at least one of the inlet passages passes through a plenum section of one or more adjacent disks to exit through one or both of the first outlet passage and the second outlet passage.

12. A vent diffuser comprising:
an elongated hollow pipe having a terminal end of the pipe;
an end plate coupled to terminal end of the pipe, the end plate being impermeable; and
a plurality of stacked disks disposed between the flange and the end plate, wherein each of the plurality of stacked disks includes:
an inner perimeter edge;
an outer perimeter edge;
a plurality of inlet passages disposed along the inner perimeter edge;
a plurality of outlet passages disposed along the outer perimeter edge, the plurality of outlet passages including a plurality of first outlet passages and a plurality of second outlet passages, each of the plurality of first outlet passages having a first width and each of the plurality of second outlet passages having a second width that is greater than the first width,
wherein the plurality of inlet passages and the plurality of outlet passages are arranged such that fluid entering one of the plurality of inlet passages exits through one or both of the plurality of first outlet passages and the plurality of second outlet passages, and
wherein the first outlet passages and second outlet passages cooperate to disperse the noise peak frequencies of fluid exiting the plurality of outlet passages, thereby reducing the overall noise level of fluid exiting the plurality of outlet passages,
wherein each of the plurality of first outlet passages and the plurality of second outlet passages are defined by a first lateral edge, a second lateral edge, and a circumferential inner edge, and wherein first lateral edge and the second lateral edge of each of the plurality of first outlet passages and the plurality of second outlet passages have the same length.

13. The vent diffuser of claim 12, wherein the first lateral edge and the second lateral edge of each of the plurality of first outlet passages is separated by a first angular distance, and the first angular distance is the first width, and wherein the first lateral edge and the second lateral edge of each of the plurality of second outlet passages is separated by a second angular distance, and the second angular distance is the second width.

14. A vent diffuser comprising:
an elongated hollow pipe having a closed, impermeable bottom portion;
a plurality of vent apertures extending though the pipe such that an interior of the pipe is in fluid communication with the atmosphere,
wherein the plurality of vent apertures includes a plurality of circular first vent apertures and a plurality of circular second vent apertures, and each of the plurality of second vent apertures has a diameter than is greater than the diameter of each of the plurality of first vent apertures, and
wherein the plurality of first vent apertures and the plurality of second vent apertures cooperate to disperse the noise peak frequencies of fluid exiting the plurality of vent apertures, thereby reducing the overall noise level of fluid exiting the plurality of vent apertures.

15. The vent diffuser of claim 14, wherein each of the plurality of first vent apertures is adjacent to at least one of the plurality of second vent apertures.

16. The vent diffuser of claim 14, wherein one of the plurality of first vent apertures is disposed between a first pair of second vent apertures, and the first vent aperture and the first pair of second vent apertures is circumferentially aligned.

17. A control valve comprising:

a housing having an inlet and an outlet;

a valve seat disposed within the housing between the inlet and the outlet;

a valve plug vertically displacable from a first position in which the valve plug sealingly engages the valve seat to a second position in which the valve plug is remotely disposed from the valve seat; and a valve cage disposed within the housing, the valve cage being positioned adjacent to the valve seat such that the valve cage surrounds the valve plug, the valve cage comprising:

an elongated hollow pipe;

a plurality of vent apertures extending though the pipe such that an interior of the pipe is in fluid communication with the exterior of the pipe, wherein the plurality of vent apertures includes a plurality of circular first vent apertures and a plurality of circular second vent apertures, and each of the plurality of second vent apertures has a diameter than is greater than the diameter of each of the plurality of first vent apertures, and wherein the plurality of first vent apertures and the plurality of second vent apertures cooperate to disperse the noise peak frequencies of fluid exiting the plurality of vent apertures, thereby reducing the overall noise level of fluid exiting the plurality of vent apertures.

* * * * *